(12) United States Patent
Ahn (10) Patent No.: US 7,720,494 B2
(45) Date of Patent: May 18, 2010

(54) METHOD OF APPLYING FOR COMMUNICATION SERVICE AND COMMUNICATION TERMINAL THEREOF

(75) Inventor: Gye Myeong Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 11/364,410

(22) Filed: Mar. 1, 2006

(65) Prior Publication Data

US 2006/0199600 A1 Sep. 7, 2006

(30) Foreign Application Priority Data

Mar. 2, 2005 (KR) .............. 10-2005-0017200

(51) Int. Cl.
*H04Q 7/20* (2006.01)
(52) U.S. Cl. ................. 455/466; 455/417
(58) Field of Classification Search ........ None
See application file for complete search history.

(56) References Cited

U.S. PATENT DOCUMENTS

2004/0199649 A1 10/2004 Tarnanen et al.

2006/0094411 A1 * 5/2006 Dupont .............. 455/417

FOREIGN PATENT DOCUMENTS

| CN | 1330474 A | 1/2002 |
|----|-----------|--------|
| JP | 2003-67311 | 3/2003 |
| KR | 2005-0090753 A | 9/2005 |
| WO | WO-01/84868 A1 | 11/2001 |
| WO | WO-2004/036941 A2 | 4/2004 |
| WO | WO 2004036941 A2 * | 4/2004 |

* cited by examiner

*Primary Examiner*—Lester Kincaid
*Assistant Examiner*—Phuoc Doan
(74) *Attorney, Agent, or Firm*—Birch, Stewart, Kolasch & Birch, LLP (57) ABSTRACT

A method of applying for a communication service and a communication terminal thereof are discussed. According to an embodiment, the method includes generating, by a terminal, at least one message including information necessary for the opening; transmitting the generated message to a server that supports the opening of the communication service; connecting a call for the opening between the server and the terminal based on the message received by the server; and performing an opening process of the communication service through the connected call.

21 Claims, 4 Drawing Sheets

```
┌─────────────────────────────┐
│                             │
├─────────────────────────────┤
│        CREATE MSG           │
├─────────────────────────────┤
│ To : *228                   │
│ 1. Desired number           │
│    1111                     │
│    2222                     │
│    3333                     │
│ 2. Subscriber name          │
│    Hong Kil-Dong            │
│ 3. Social security number   │
│ 750220-1111111              │
│ 4. Billing system selection │
│ 5. Payment system           │
├─────────────────────────────┤
│ [abc]    [Send]   [Options] │
└─────────────────────────────┘
```

FIG. 3

METHOD OF APPLYING FOR COMMUNICATION SERVICE AND COMMUNICATION TERMINAL THEREOF

This application claims the priority benefit of the Korean Patent Application No. 10-2005-0017200, filed on Mar. 2, 2005 in Republic of Korea, which is hereby incorporated by reference as if fully set forth herein.

BACKGROUND OF THE INVENTION

1. Field of the Invention

The present invention relates to an application for a communication service, and more particularly, to a method of applying for a communication service and to a communication terminal thereof. Although the present invention is suitable for a wide scope of applications, it is particularly suitable for making an application for an opening of a communication service.

2. Description of the Related Art

Generally, a communication service provider has provided a wireless communication service for transferring data requested by a communication terminal subscriber. And, a representative one of the wireless communication services is the OTA (over-the-air) service.

In the OTA service, once a subscriber makes a request for data to a service customer center via a communication terminal of the subscriber, the requested data is transferred from the service customer center to the communication terminal of the subscriber.

For the OTA service, the subscriber needs to make an OTA call to the service customer center directly and inform, through the OTA call, the service customer center of information about specific data that the subscriber desires.

In the case of using the OTA service, the service provider provides the subscriber with the requested specific data through the communication terminal of the subscriber. In addition, the service provider takes advantage of providing various kinds of advertisements to the subscriber's communication terminal via the OTA service.

Meanwhile, to be provided with a communication service in the related art, a subscriber needs to make an application for an opening for the communication service to a service customer center. In the case of making an application for an opening for a communication service using an OTA service, a subscriber has to make the application for the opening by making an OTA call to a service customer center directly as mentioned.

However, if the subscriber is located in an area of poor signal transmission/reception, the subscriber's communication terminal is unable to transmit the OTA call. Hence, the subscriber cannot make the application for an opening for a communication service and thus cannot receive desired specific data.

SUMMARY OF THE INVENTION

Accordingly, the present invention is directed to a method of applying for a communication service and a communication terminal thereof that substantially obviate one or more problems due to limitations and disadvantages of the related art.

An object of the present invention is to provide a method of applying for a communication service and a communication terminal thereof, by which the communication service can be smoothly operated.

Another object of the present invention is to provide a method of applying for a communication service and a communication terminal thereof, by which an application for an opening of the communication service can be made using a short message service (or other message service), thereby achieving a smooth operation of the communication service.

A further object of the present invention is to provide a method of applying for a communication service and a communication terminal thereof, by which an application for an opening of the communication service can be made in an area having poor signal transmission/reception using a short message service (or other message service).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of applying for an opening of a communication service according to an embodiment of the present invention includes generating at least one message including information necessary for the opening, transmitting the generated message to a server supporting the opening of the communication service, connecting a call for the opening between the server and an opened object, and performing an opening process of the communication service through the connected call.

According to an embodiment of the present invention, the message includes one of messages according to a short message service, an electronic mail service, a long message service, or a multimedia message service.

According to an embodiment of the present invention, the server can be an over-the-air server. The information can include an identification number of the server corresponding to a reception number of the message. The information can include an identification number of the opened object corresponding to a transmission number of the message. The information can include intrinsic personal information of a user of the opened object. The information can include information associated with a use of the communication service. The information can include a desired number to be used for the use of the communication service, a billing system of the communication service, a payment system of the communication service and additional service options.

According to an embodiment of the present invention, the message can include identification information indicating that the message is for the application for the opening of the communication service.

In another aspect of the present invention, a communication terminal includes a first part for generating at least one message including information necessary for an opening of a communication service, a second part for transmitting the generated message to a server supporting the opening of the communication service, and a third part for receiving a message indicating a completion of the opening of the communication service from the server.

According to an aspect of the present invention, there is provided a method of applying for an opening of a communication service, the method comprising: generating, by a terminal, at least one message including information necessary for the opening; transmitting the generated message to a server that supports the opening of the communication service; connecting a call for the opening between the server and the terminal based on the message received by the server; and performing an opening process of the communication service through the connected call.

According to another aspect of the present invention, there is provided a communication terminal comprising: a generator to generate at least one message including information necessary for an opening of a communication service; a transmitter to transmit the generated message to a server supporting the opening of the communication service; and a receiver to receive a message indicating a completion of the opening of the communication service from the server.

According to another aspect of the present invention, there is provided a method of applying for an opening of a communication service, the method comprising: generating, by a communication terminal, a short message service (SMS) message including identification information and service opening information for the opening of the communication service; transmitting the generated SMS message to a server that supports the opening of the communication service; and receiving, by the communication terminal, a response to the transmitted SMS message from the server, the response pertaining to the opening of the communication service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, a communication terminal according to the present invention preferably includes a mobile communication terminal securing its mobility and supports a mobile communication service and a short message service.

In the following description, a short message service (hereinafter abbreviated as SMS) message is exemplarily used as a transmission message for applying for an opening of a communication service, which does not put a limitation on a scope of application of the present invention.

The present invention according to an embodiment supports an OTA message and an SMS message to make an application for an opening of a communication service. So, a user can select either the OTA service or the SMS service for the opening of the communication service. In the following description, the user selects the SMS for the application for the opening of a communication service, only as an example.

Figure 1:
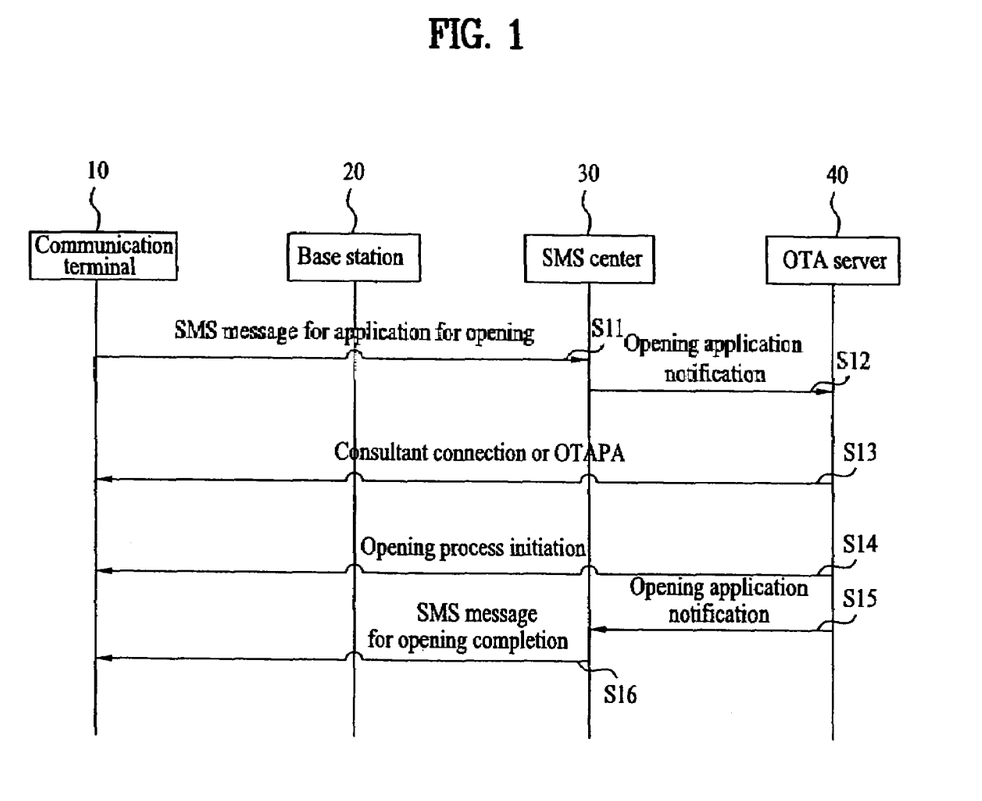
FIG. 1 is a flowchart of a system configuration for a communication service application and a procedure for applying for an opening of a communication service according to one preferred embodiment of the present invention.
Figure 2A:
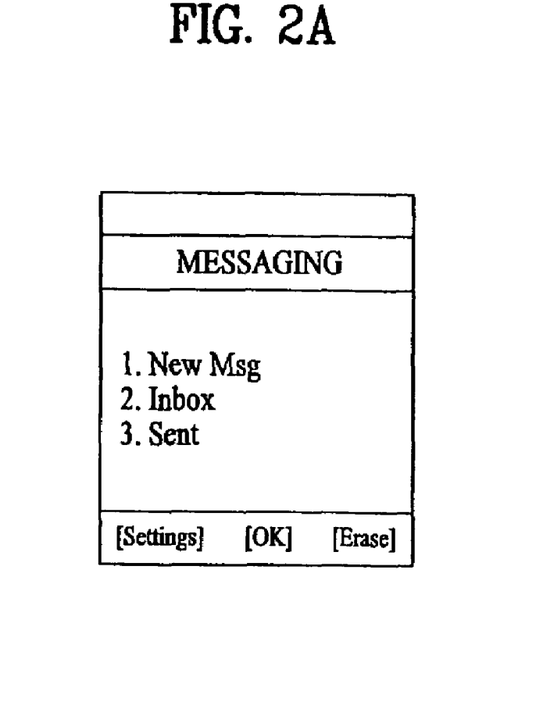
FIGS. 2A to 2C are examples of menus for explaining the procedure for applying for an opening of a communication service according to one preferred embodiment of the present invention.
Figure 2B:
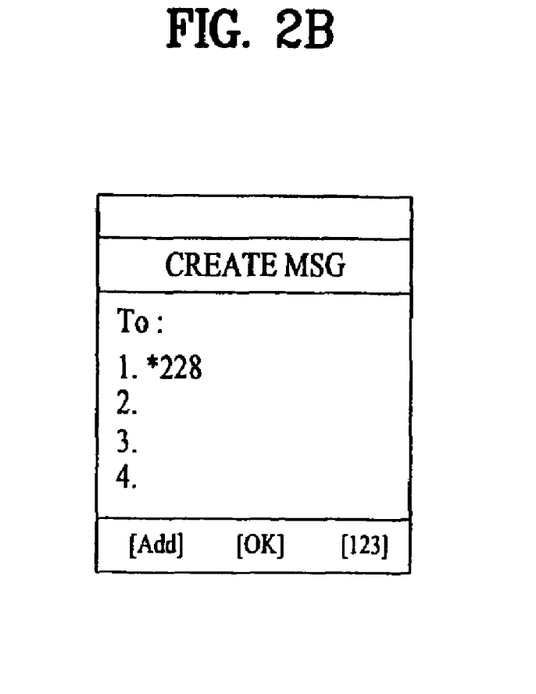
Figure 2C:
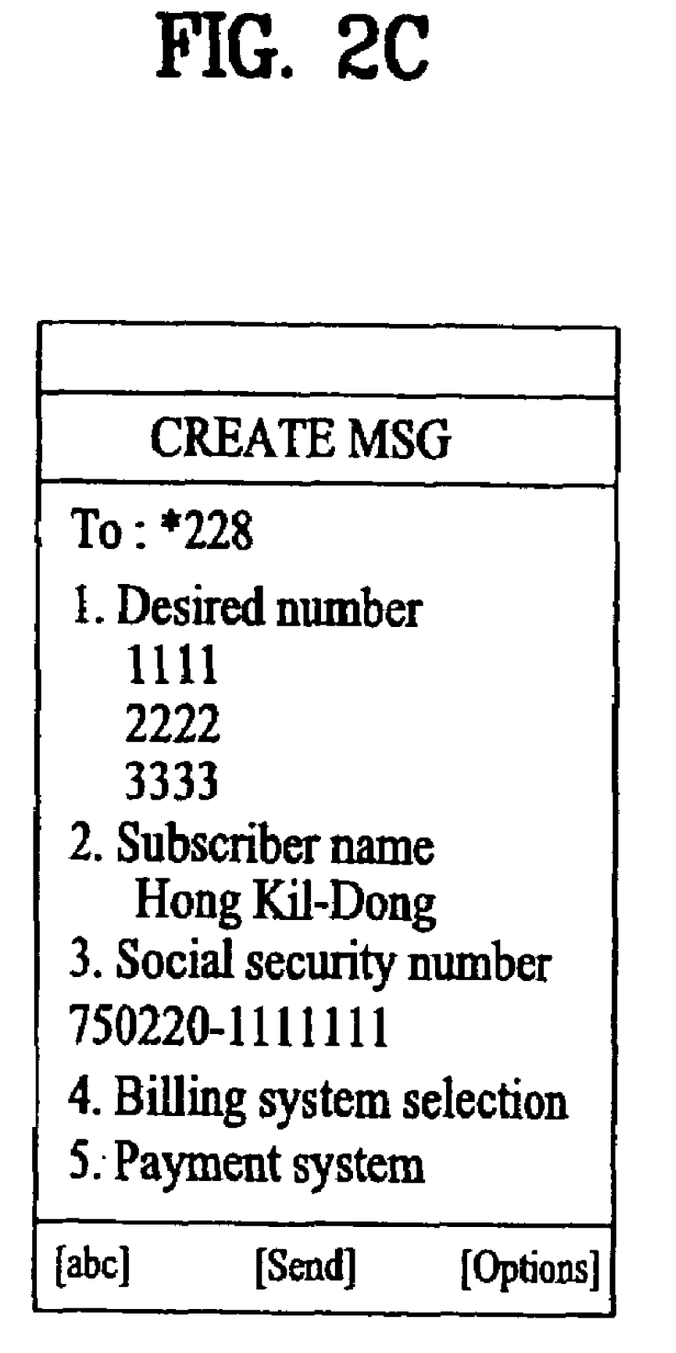

FIG. 1 is a flowchart of a system configuration for a communication service application and a procedure for applying for an opening of a communication service according to one preferred embodiment of the present invention. FIGS. 2A to 2C are diagrams for explaining a procedure for applying for an opening of a communication service according to one preferred embodiment of the present invention.

Referring to FIGS. 1 to 2C, a system according to an embodiment of the present invention includes a communication terminal 10, a base station 20, an SMS center 30 and an OTA service 40, all operatively coupled. The communication terminal 10 can be a mobile terminal such as mobile phone, a PDA, etc. or an Internet-accessible computer. The communication terminal 10 as such can include commonly known components.

Figure 3:
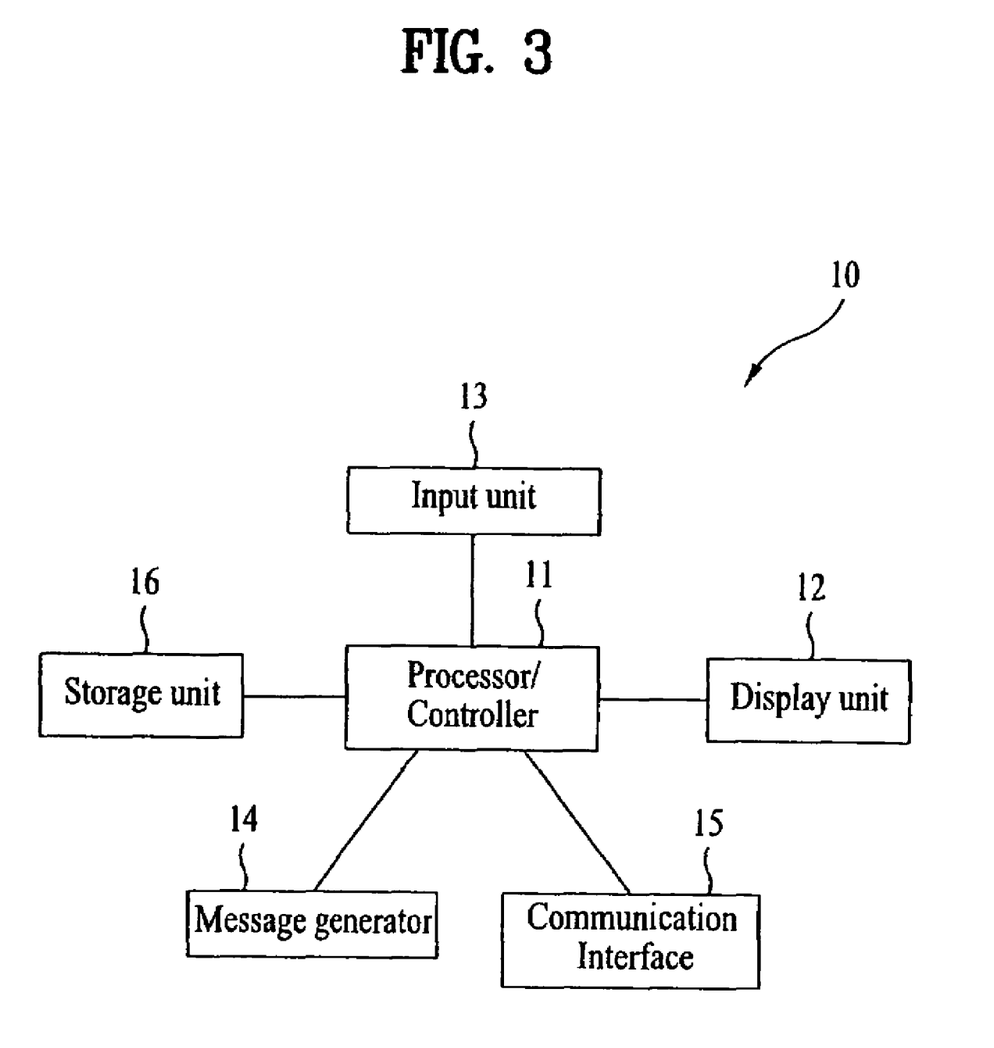
FIG. 3 is a block diagram of an example of a configuration of a communication terminal according to an embodiment of the present invention.

For instance, the communication terminal 10 according to an embodiment includes, but is not limited to, a processor/controller 11, at least one display unit 12, an input unit 13 such as a keypad, a storage/memory unit 16, a communication interface 15 such as wireless communication interface, etc. Further, the communication terminal 10 includes a message generator 14 for generating an SMS message or other type message that is used to apply for an opening of a communication service according to the present invention. The communication terminal 10 communicates this message and other messages with the SMS center 30 and/or OTA server 40 via the communication interface 15. In this regard, the communication interface 15 functions both as a receiver and a transmitter; however, separated receiver and transmitter can instead be provided in the communication terminal 10. All the components of the communication terminal 10 are operatively coupled.

The procedure for applying for an opening of a communication service or altering the opening information according to the present invention, which is discussed below in more detail, in part can be implemented in computer software storable in the communication terminal 10 and readable by the processor/controller 11 of the communication terminal 10.

First of all, according to an embodiment, the base station 20 relays an SMS message between the communication terminal 10 and the SMS center 30. And, the base station 20 relays signals associated with an opening of a communication service between the communication terminal 10 and the OTA server 40. The communication terminal 10 and the base station 20 communicate with each other via known techniques/networks, and the base station 20 and the SMS center 30 communicate with each other via known techniques/networks. In other examples, the Internet or other interface may communicate the SMS message/response between the communication terminal 10 and the SMS center 30 and/or OTA server 40.

The communication terminal 10 generates the SMS message as a target of the communication service opening. The communication terminal 10 then transmits the generated SMS message to the SMS center 30 via the base station 20.

One purpose of this SMS message is to apply for the communication service opening. So, the SMS message contains service opening information, i.e., opening information about the communication service opening. And, the SMS message further contains identification information indicating its purpose to apply for the communication service opening. Other information/data may be included in the SMS message.

The SMS center 30 receives the SMS message from the communication terminal 10 and confirms a usage for applying for the communication service opening via the identification information included in the received SMS message. Correspondingly, the SMS center 30 transmits the corresponding SMS message or the (service) opening information contained in the SMS message to the OTA server 40. Whether the SMS center 30 transmits the SMS message to the OTA server 40 or transmits the opening information to the OTA server 40 in a different transmission format depends on a system implementation. Accordingly, the OTA server 40 receives the service opening information.

According to an embodiment, the service opening information includes a reception number, a transmission number, personal information of a user (subscriber), and service associated information (e.g., user-specific number, communication service charging system, payment system, additional service option and the like in using the communication service).

The reception number in the service opening information is, e.g., a reception number of the SMS message and is an intrinsic identification number given to the OTA server 40.

The transmission number in the service opening information is an intrinsic identification number given to the communication terminal 10 that transmits the SMS message. For instance, the transmission number includes at least one of the following: a phone number of the communication terminal 10, a serial number of the communication terminal 10, ESN (electronic serial number), or the like.

The personal information in the service opening information includes, e.g., a subscriber's name, a social security number, etc.

The service associated information in the service opening information includes user-specific numbers, user-specific billing and payment systems, payment information (subscriber's address, discount information, etc.), additional service options and the like.

According to an embodiment, the communication terminal 10 is provided with a menu for creating an SMS message including the opening information and the identification information for the communication service opening. It is a mater of course that the menu supports a creation of a general SMS message to transmit to a different communication terminal.

According to an embodiment, the communication terminal 10 is provided with at least one or more management menus (e.g., "MESSAGING" as shown in FIG. 2A) for SMS. Each of the management menus includes a plurality of sub-menus. As the sub-menus, there are a menu for creating a new message, a menu for managing received messages, a menu for managing transmitted messages and the like.

The communication terminal 10 displays, e.g., on the display unit 12 of the terminal 10, a plurality of such sub-menus as illustrated in FIG. 2A if a user requests an SMS.

In the example of FIG. 2A, "1. New Msg" is a sub-menu for creating a new message, "2. Inbox" is a sub-menu for managing received messages, and "3. Sent" is a sub-menu for managing transmitted messages.

Subsequently, once the user selects "1. New Msg", e.g., using the input unit 13 of the communication terminal 10, the communication terminal 10 provides a menu environment (e.g., "CREATE MSG" as shown in FIG. 2B) for creating a new message such as a new SMS message for applying for an opening of a communication service. The user preferentially inputs the reception number such as the identification number of the OTA server 40 and then inputs the other opening information of the communication service using the input unit 13 of the communication terminal 10. An example of inputting a reception number is shown in FIG. 2B and an example of inputting other opening information which may be necessary for a service opening is shown in FIG. 2C.

Once the user inputs the identification number of the OTA server 40, an editing box, as shown in FIG. 2C, automatically appears on the display unit 12 of the communication terminal 10. After the opening information of the communication service has been input in the editing box, the communication terminal 10 creates an SMS message based on the input information (and other necessary information) to transmit it, e.g., via the communication interface 15.

Meanwhile, the above-narrated opening information (e.g., reception number, transmission number, user's personal information, service associated information) may vary according to a service provider. So, the opening information is defined as information requested (e.g., by a service provider) for the opening of the communication service, and the present invention is not limited to the example shown in FIGS. 2A-2C.

A configuration of an SMS message for a communication service opening according to an embodiment of the present invention is explained as follows.

TABLE 1

| Field | Length (bits) | Content |
|---|---|---|
| BLOCK_ID | 8 | Message applying for communication service opening using SMS |
| Data Size | 8 | Size of each data area |
| Data | 8 × [data size] | Opening data corresponding to opening information necessary for service opening |

An SMS message according to the present invention has a "BLOCK_ID" field, a "Data Size" field, and a "Data" field as shown in Table 1. The "BLOCK_ID" field indicates that the corresponding SMS message is a message applying for an opening of a communication service (identification information). For instance, if the "BLOCK_ID" field value (in Table 1) of a received SMS message is '00010000', it indicates that the received SMS message is a message applying for an opening of a communication service. So, in the case of receiving an SMS message having the "BLOCK_ID" value set to '00010000', the SMS center 30 delivers the received SMS message to the OTA server 40. And, the SMS center 30 thereafter transmits an SMS message indicating the completion of the opening of the communication service to the communication terminal 10.

Meanwhile, the "Data size" field in Table 1 indicates a data area size of each SMS message in which service opening information is inserted. The "Data" field in Table 1 contains opening data corresponding to the service opening information necessary for a service opening.

The opening data can be explained referring to Table 2. In particular, an example of a format of such opening data is shown in Table 2. A case where the opening data is divided into different parts and carried in a plurality of SMS messages is taken into consideration by Table 2.

In the case where the opening data in its entirety cannot be carried on one SMS message to be transmitted to the SMS center 30, the present invention according to an embodiment divides the opening data corresponding to the opening information to be carried on each data area of a plurality of SMS messages. So, the entire opening data can be carried using a plurality of segments.

TABLE 2

| Field | Length (bits) | Content |
|---|---|---|
| Reserved | 7 | Reserved bits |
| LAST_SEGMENT | 1 | '1', if a last data area for opening information is included. Otherwise, '0'. |
| SEGMENT_OFFSET | 16 | Offset from start of entire opening information to be transmitted by communication terminal |
| SEGMENT_SIZE | 8 | Each segment size of opening data corresponding to opening information |
| SEGMENT_DATA | 8 × [data size] | Opening data content |

In Table 2, a "LAST_SEGMENT" field indicates a last segment among a plurality of segments configuring the opening data and identifies an SMS message having a data area, in which the last segment is inserted, from a plurality of SMS messages used in transmitting the opening data.

For instance, in case that the last segment of the opening information is inserted in a data area of a current SMS message, the "LAST_SEGMENT" field value of this SMS message is '1'. Otherwise, it is '0'.

Meanwhile, a "SEGMENT_OFFSET" field indicates an order of a segment inserted in a data area of a current message among segments configuring opening data.

For instance, if the "SEGMENT_OFFSET" field value of an SMS message having a first segment of the opening data inserted therein is '10' and if a unit offset value is '10', then the "SEGMENT_OFFSET" field value of an SMS message having a fourth segment of the opening data inserted therein is '40'.

Table 3 corresponds to a "SEGMENT_DATA" field in Table 2 and shows an example of opening data to be transmitted for a communication service opening.

TABLE 3

| Field | Length (bits) |
|---|---|
| No. of desired numbers | 8 (maximum 3) |
| Desired number | 34 |
| Subscriber name | 480 (30 characters in Korean) |
| Social security number | 52 (7 digits) |
| Billing system | 8 |
| Payment system | 8 |
| Information about payment | Variable |
| Reserved | 2 or 6 |

In Table 3, the desired numbers are the numbers a user intends to use for a communication service. As the user inputs at least one of user-specific numbers, the inputted number is decided as the desired number of the user. In this case, the desired number corresponds to the entire or partial numbers used for the communication service. A service provider gives one of the desired numbers as an intrinsic number of the communication terminal 10 or user. If the desired numbers correspond to those already given, numbers similar to the desired numbers are given. As an example of the desired number, a MIN (mobile identification number) may be used.

Table 4 exemplarily shows parameters defined in a "Payment System" field shown in Table 3 and provides information related to payment for the desired communication service may be paid.

TABLE 4

| Parameter | ID |
|---|---|
| Giro payment | '00000001' |
| Account money transfer | '00000010' |
| Payment by credit card | '00000011' |

Table 5 shows a configuration of 'Giro payment' parameter shown in Table 4. In this example, an 'Address' field provides a subscriber address to receive a giro.

TABLE 5

| Field | Length (bits) |
|---|---|
| Address information size | 8 |
| Address | Address information size × 8 |

Table 6 shows a configuration of an "Account money transfer" parameter shown in Table 4 and can provide information for transferring money to an account to make payment for the communication service or other reason.

TABLE 6

| Field | Length (bits) |
|---|---|
| Account information size | 8 |
| Account | Account information size × 8 |

Table 7 shows a configuration of a "Payment by credit card" parameter shown in Table 4 and can provide information on credit card to be used make payment for the communication service or other reason.

TABLE 7

| Field | Length (bits) |
|---|---|
| Account information size | 8 |
| Account | Account information size × 8 |

Above Tables 1-7 provide examples of information that can carried in the SMS message according to the present invention. Other variations in the information and/or structure of the tables can be used.

The OTA server 40 having received the above-explained SMS message supports the opening of the communication service. The OTA server 40 confirms that there is an application for the communication service opening from the identification information (e.g., the "BLOCK_ID" field in Table 1) contained in the SMS message received from the SMS center 30. Subsequently, after the completion of a reception of the SMS message containing the last segment, i.e., a reception of the entire opening data, the OTA server 40 transmits a corresponding response to the communication terminal 10. The response that the OTA server 40 directly transmits to the communication terminal 10 is OTAPA (OTA parameter administration). Alternatively, after the completion of the reception of the entire opening data by the OTA server 40, a call between the communication terminal 10 and a consultant is established.

Subsequently, the OTA server 40 carries out a communication service opening processing. The OTA server 40 then transmits a notification message, which indicates that the opening of the communication service has been completed, to the communication terminal 10 via the SMS center 30.

Thus, opening the communication service for the communication terminal 10 is successfully completed.

A process for making an opening application for a communication service according to an embodiment of the present invention is explained as follows referring to FIG. 1. This process can be implemented using the data formats of above Tables 1-7.

First of all, once a user inputs opening information for a communication service opening, e.g., via a menu (e.g., the menus of FIGS. 2A-2C) provided on the communication terminal 10, the message generator 14 of the communication terminal 10 creates an SMS message containing the inputted opening information.

The communication terminal 10 transmits the created SMS message for the opening application to the SMS center 30 via the communication interface 15 and the base station 20 (S11). In this case, the SMS message includes a reception number, a transmission number and opening information.

Meanwhile, the SMS message further includes the identification information (e.g., "BLOCK_ID" field of Table 1) indicating that it is a message for the communication service opening application. So, the SMS center 30 identifies whether a currently received SMS message is a general message or a message for the communication service opening application based on the identification information.

If the SMS center 30 determines that the received SMS message is for the communication service opening application by examining the identification information in the SMS message, the SMS center 30 notifies the OTA server 40 that there is a communication service opening application (S12). In doing so, it is preferable that the SMS center 30 delivers the received SMS message to the OTA server 40. Alternatively, after having extracted the opening information from the received SMS message, the SMS center 30 notifies the extracted information to the OTA server 40.

For the opening application notification, the OTA server 40 establishes a call between the communication terminal 10 and a consultant, or transmits OTAOA (OTA parameter administration) to the communication terminal 10 (S13). Through the OTAPA, a call for the communication service opening is established. Such calls can be established using in part, e.g., the information contained in the SMS message.

An opening process of the corresponding communication service is initiated via the established call (S14). Once the opening process is completed, the OTA server 40 transmits an SMS message that indicates an opening completion to the communication terminal 10 via the SMS center 30 and the communication interface 15 of the communication terminal 10 (S15, S16).

Meanwhile, the above description mainly deals with an example for opening of the communication service. Yet, the present invention is identically applicable to a case that the opening information for the communication service is altered.

In particular, by including the altered or modified opening information in the SMS message that includes the identification information indicating the alteration of the opening information associated with the communication service, the corresponding SMS message is transmitted to the OTA server 40. Then the previous opening information for the communication service at the OTA server 40 is altered entirely or in part, corresponding to the newly received SMS message.

Although the embodiments of the present invention have been discussed in connection with using an SMS service to apply for a communication service, the present invention is not limited thereto and other types of message service such as an electronic mail service, a long message service, a multimedia message service, etc. can be equally used.

Accordingly, the present invention provides the following effects and/or advantages.

First of all, in the above-explained description of the present invention, the application for the opening of the communication service or for the alteration of the previous opening information is made using the SMS message. Hence, even if a user is located in an area where signal transactions are not smooth, the application for the communication service is still facilitated.

Secondly, the present invention can implement the OTA service in an area having poor signal transactions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of applying for an opening of a communication service, the method comprising:
   generating, by a terminal, at least one message requesting the opening of the communication service including opening request information and an opening request message ID that indicates that the at least one message is an opening request message;
   transmitting the generated message to a server that supports the opening of the communication service;
   connecting a call for the opening between the server and the terminal based on the message received by the server; and
   performing an opening process of the communication service through the connected call,
   wherein the opening request information included in the message includes at least one of a desired number to be used for a use of the communication service, a billing system of the communication service, a payment system of the communication service, and additional service options, and wherein an editing box displaying an identification number of the server is automatically displayed on a display of the terminal once the identification number is input to the terminal.

2. The method of claim 1, wherein the message is a message of a short message service, an electronic mail service, a long message service, or a multimedia message service.

3. The method of claim 1, wherein the server is an over-the-air server.

4. The method of claim 1, wherein the opening request information included in the message includes an identification number of the server corresponding to a reception number of the message.

5. The method of claim 1, wherein the opening request information included in the message includes an identification number of the terminal corresponding to a transmission number of the message.

6. The method of claim 1, wherein the opening request information included in the message includes intrinsic personal information of a user associated with the terminal.

7. The method of claim 1, wherein the opening request information included in the message includes information associated with a use of the communication service.

8. The method of claim 1, wherein the message includes identification information indicating that the message is for an application for the opening of the communication service.

9. A communication terminal, comprising:
- a generator to generate at least one message including opening request information for an opening of a communication service and an opening request message ID that indicates that the at least one message is an opening request message;
- a transmitter to transmit the generated message to a server supporting the opening of the communication service; and
- a receiver to receive a message indicating a completion of the opening of the communication service from the server,
- wherein the opening request information included in the message includes at least one of a desired number to be used for a use of the communication service, a billing system of the communication service, a payment system of the communication service, and additional service options, and wherein an editing box displaying an identification number of the server is automatically displayed on a display of the communication terminal once the identification number is input to the communication terminal.

10. The communication terminal of claim 9, wherein the message is a message of a short message service, an electronic mail service, a long message service, or a multimedia message service.

11. The communication terminal of claim 9, wherein the opening request information included in the message includes an identification number of the server corresponding to a reception number of the message.

12. The communication terminal of claim 9, wherein the opening request information included in the message includes an identification number of the terminal corresponding to a transmission number of the message.

13. The communication terminal of claim 9, wherein the opening request information included in the message includes intrinsic personal information of a user associated with the communication terminal.

14. The communication terminal of claim 9, wherein the opening request information included in the message includes information associated with a use of the communication service.

15. The communication terminal of claim 9, wherein the message includes identification information indicating that the message is for an application for the opening of the communication service.

16. A method of applying for an opening of a communication service, the method comprising:
- generating, by a communication terminal, a short message service (SMS) message including identification information, an opening request message ID that indicates that the SMS message is an opening request message, and service opening information for the opening of the communication service;
- transmitting the generated SMS message to a server that supports the opening of the communication service; and
- receiving, by the communication terminal, a response to the transmitted SMS message from the server, the response pertaining to the opening of the communication service
- wherein the service opening information included in the SMS message includes a desired number to be used for a use of the communication service, a billing system of the communication service, a payment system of the communication service, and additional service options, and wherein an editing box displaying an identification number of the server is automatically displayed on a display of the communication terminal once the identification number is input to the communication terminal.

17. The method of claim 16, wherein the service opening information includes a reception number of the SMS message.

18. The method of claim 17, wherein the service opening information further includes a transmission number of the SMS message.

19. The method of claim 18, wherein the service opening information further includes personal information of a user associated with the communication terminal.

20. The method of claim 19, wherein the service opening information further includes information associated with a use of the communication service.

21. The method of claim 16, wherein the identification information indicates whether or not the SMS message is for an application for the opening of the communication service.

* * * * *